United States Patent
Speakes et al.

[19]

[11] Patent Number: 5,820,075
[45] Date of Patent: Oct. 13, 1998

[54] AIRCRAFT CARGO POD

[75] Inventors: Dale M. Speakes, Auburn, Wash.; David M. Jensen, Sun Valley, Id.

[73] Assignee: Creative Aeronautical Accessorie, Inc., Bellevue, Wash.

[21] Appl. No.: 757,519

[22] Filed: Nov. 27, 1996

[51] Int. Cl.$^6$ ........................................ B64G 1/20
[52] U.S. Cl. .................. 244/118.2; 224/401; 224/538; 224/540
[58] Field of Search ............... 244/118.1, 118.2, 244/17.11, 400, 401, 29.5, 538, 539, 540; 220/345, 346

[56] References Cited

U.S. PATENT DOCUMENTS

| | | | |
|---|---|---|---|
| D. 149,555 | 5/1948 | Hibbard | 244/118.2 |
| 2,352,323 | 6/1944 | Hooker | 244/118.2 |
| 2,388,380 | 11/1945 | Bathurst | 244/118.2 |
| 2,557,962 | 6/1951 | Greene | 244/118.2 |
| 2,597,563 | 5/1952 | Breauzeale, Jr. | 244/118.2 |
| 3,764,048 | 10/1973 | Gore | 224/538 |
| 3,778,011 | 12/1973 | Cannon | 224/401 |
| 5,577,629 | 11/1996 | Rosler | 220/346 |

FOREIGN PATENT DOCUMENTS

| | | | |
|---|---|---|---|
| 2543479 | 4/1977 | Germany | 244/118.2 |

*Primary Examiner*—S. Joseph Morano
*Attorney, Agent, or Firm*—Seed and Berry LLP

[57] ABSTRACT

An aircraft cargo pod for use with helicopters, the pod having a container slidably engaged with a mounting assembly mounted to the underside of the helicopter fuselage. The mounting assembly includes a plate having a pair of side rails sized and shaped to engage channels formed in the sidewalls of the container. The sidewalls and backwalls circumscribe an open top of the container to provide unobstructed access to the entire length of the container. Thus, the aircraft cargo pod of the present invention facilitates easy installation and removal and provides unobstructed access to the interior to facilitate loading and unloading of long and bulky items, such as golf clubs, skis, long-handled tools and the like.

5 Claims, 2 Drawing Sheets

AIRCRAFT CARGO POD

TECHNICAL FIELD

The present invention pertains to cargo containers for use with aircraft, and, more particularly, to an external aircraft cargo pod with removable container adapted for use with fixed and rotary wing craft.

BACKGROUND OF THE INVENTION

Existing aircraft cargo containers used on the exterior of aircraft are typically fixed in place on the sides or lower portions of the fuselage of the aircraft and are equipped with various doors, hatches, and the like for loading and unloading cargo, such as baggage, equipment, accessories, etc. In many cases, these existing containers are inconvenient to use because they are located close to the ground, making access difficult. In addition, access can be inhibited or even prevented because of struts, wires, landing gear, etc. Removal of the container is impractical because it requires special tools and expertise.

In many cases, it is desirable to have a container that is easily accessible for loading long and bulky items, such as golf clubs, skis, long-handled tools, and the like. Because of design limitations and space constraints, typical containers do not have doors or hatches that facilitate storing of bulky equipment and cargo. Removing such containers from the craft would be useless because they do not have openings large enough to facilitate loading of bulky equipment and cargo.

Consequently, there is a need for an external aircraft cargo pod that is streamlined, aerodynamic, easily mountable and openable, and that provides unobstructed access to substantially the entire interior space.

SUMMARY OF THE INVENTION

A cargo pod for attachment to the exterior of an aircraft is provided. The cargo pod formed in accordance with the present invention comprises a container having sides and a bottom attached to the sides to define an open interior, the sides including channels formed therein; the container further including a cover being sized and shaped to be slidably engaged within the channels to completely cover the interior and prevent entry of the elements into the interior; a latch for latching the container to the cover to prevent unintentional disengagement of the container from the cover; and a mounting apparatus for affixing the cover to the aircraft's preexisting attachment points such that the container will be slidably engageable and disengageable without interference from the aircraft's structural components.

In accordance with another aspect of the present invention, a cargo pod for attachment to the lower exterior of the aircraft is provided. The cargo pod formed in accordance with the present invention comprises an elongated container having opposing sidewalls, a front wall, and a bottom wall, the opposing sidewalls having forward ends that join the front wall, and further having rearward ends that join together to form a V-shaped back on the container; the side, back, and bottom walls defining an unobstructed interior cavity with the sidewalls having exposed edges that circumscribe the interior cavity to define a substantially open top on the container. As such, the open top provides unobstructed access to the container. The container further includes exposed edges on the sidewalls having a track formed thereon; a mounting apparatus for mounting the container on the lower exterior of the aircraft so that the longitudinal axis of the elongated container is parallel to the longitudinal access of the aircraft, the mounting apparatus comprising attachment members for attachment to existing attachment points on the exterior under the aircraft, and further comprising sides that engage the track such that the container is slidably engageable with the track from the rear of the aircraft to move from a disengaged position to a fully engaged position; the mounting apparatus further comprising a cover for completely covering the interior cavity when the container is in the fully engaged position.

In accordance with another aspect of the present invention, the cargo pod further includes a securing apparatus for securing the carriage to the mounting apparatus when the carriage is in the fully engaged position.

In accordance with yet another aspect of the present invention, the track comprises a channel formed in the exposed edges of each of the sidewalls.

In accordance with yet a further aspect of the present invention, the engaging apparatus comprises reinforced side edges on the mounting apparatus that are sized and shaped to be received within the channels in the sidewalls of the container.

As will be readily appreciated from the foregoing, the present invention provides for a cargo pod having a container section that is sized and shaped to be attached underneath the exterior of the fuselage of an aircraft and provide unobstructed access to the entire interior cavity. This facilitates the storage and removal of long, bulky cargo. In addition, the container section easily slides rearward to disengage from the mounting apparatus, making it easy for ground crews to quickly disengage the container portion and remove or load cargo and then re-engage the container. The mounting apparatus of the present invention utilizes preexisting attachment points on the bottom of the aircraft. In addition, the streamlined configuration of the cargo pod renders it suitable for attachment to the bottom exterior of aircraft having low ground clearance because it presents no interference to the undercarriage.

BRIEF DESCRIPTION OF THE DRAWINGS

The foregoing and other features and advantages of the present invention will be more readily appreciated as the same become better understood from the detailed description when taken in conjunction with the following drawings, wherein.

DETAILED DESCRIPTION OF THE INVENTION

Figure 1A:
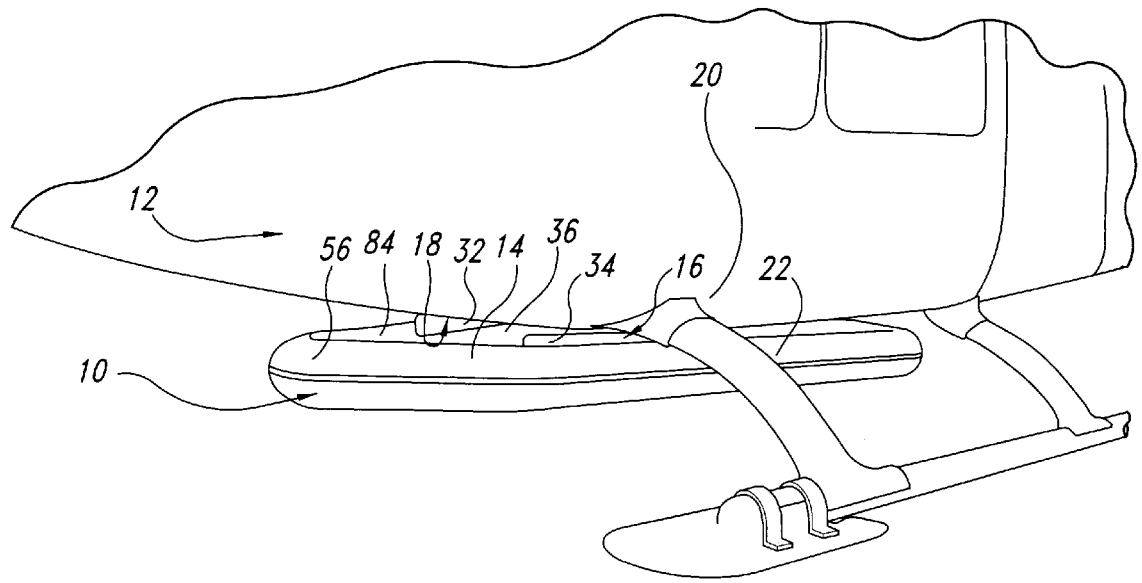
FIGS. 1A and 1B are isometric projections of a representative embodiment of the aircraft cargo pod formed in accordance with the present invention as attached to the lower exterior of a helicopter fuselage in the closed position.
Figure 1B:
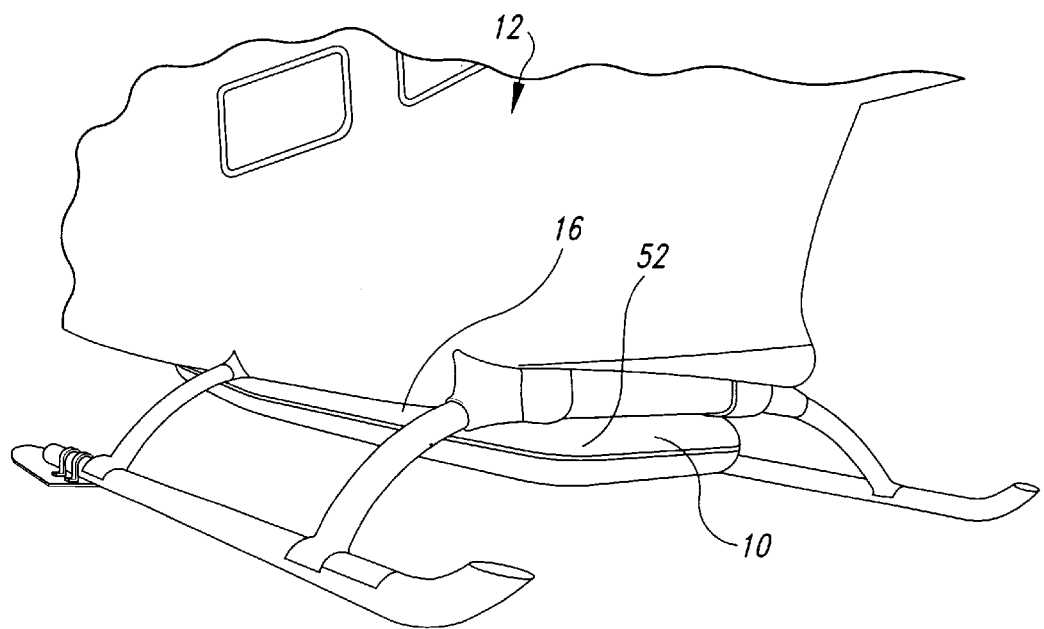

Referring to FIGS. 1–4, illustrated therein is an aircraft cargo pod 10 formed in accordance with the present invention as mounted to a helicopter 12. As shown more clearly in FIGS. 2–3, the cargo pod 10 comprises a container 14 and a mounting assembly 16 attached to the underside 18 of the helicopter fuselage 20. A skid 22 is shown projecting down from the fuselage 20. The mounting assembly 16 includes front brackets 28 and a rear bracket 29 attached to the fuselage 20 using commercially available fasteners. These front and rear brackets 28, 29 are engaged with preexisting attachment points that are built into the fuselage 20 when the helicopter 12 is manufactured. Thus, in most cases, attaching the brackets 28, 29 to the underside of any aircraft can be easily accomplished by matching the access points for the fasteners with the preexisting attachment points on the aircraft. This avoids structural modification to the aircraft and any resulting loss of structural integrity in the fuselage and frame.

Figure 2:
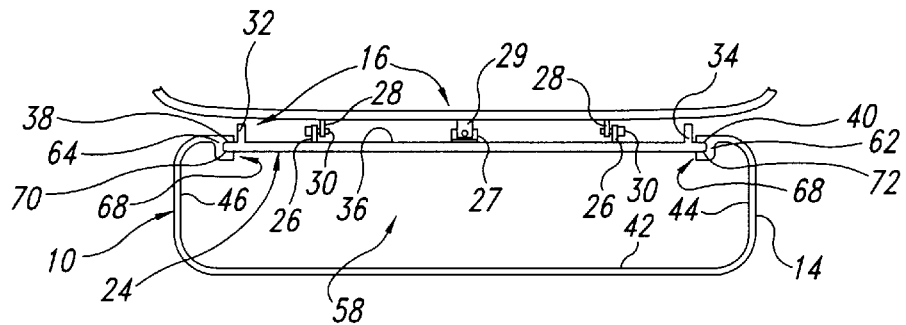
FIG. 2 is a cross-sectional view of the aircraft cargo pod taken along lines 2—2 of FIG. 1.
Figure 3:
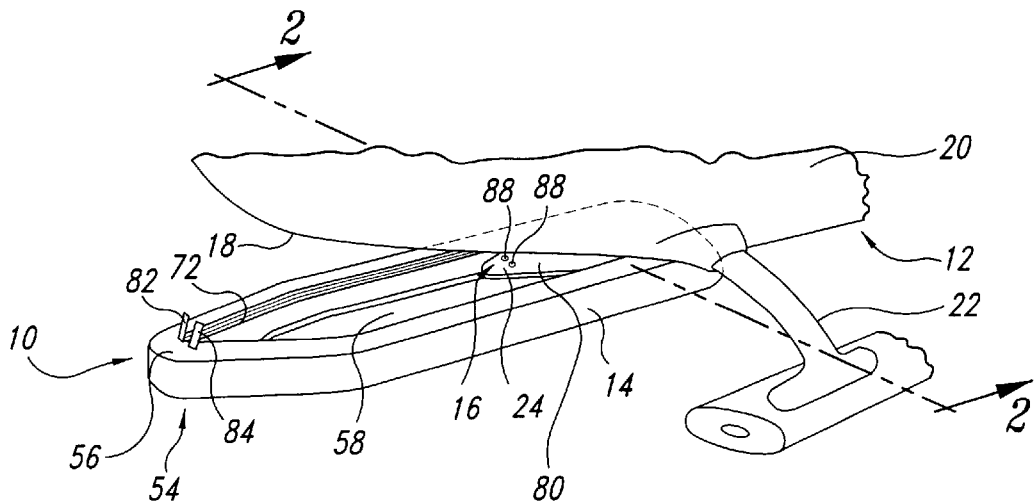
FIG. 3 is an isometric projection of the aircraft cargo pod of FIG. 1 shown in the opened configuration.
Figure 4:
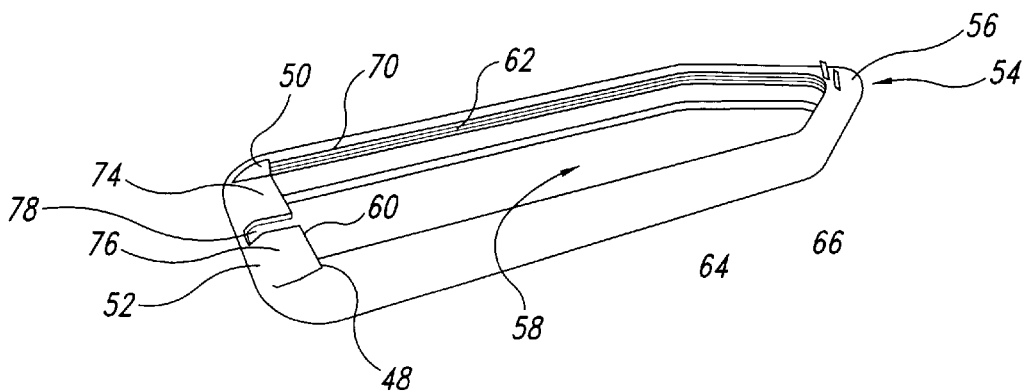
FIG. 4 is an isometric projection of the container removed from the aircraft.

The mounting assembly 16 as shown in FIG. 2 further comprises a planer-shaped plate 24 with a pair of front mounts 26 and a rear mount 27 formed thereon. The plate 24 is positioned under the fuselage 20 and the front mounts 26 are attached to the front brackets 28 and the rear mount 27 attached to the rear bracket 29 with aircraft grade fasteners 30. The plate 24 includes flanges 32 and 34 projecting at substantially a 90° angle from the top surface 36 of the plate 24 adjacent longitudinal side rails 38 and 40. These flanges 32, 34 provide rigidity to the plate 24 as they extend along the length of the elongate plate 24. The side rails 38, 40 project outward on either side of the plate 24 and are sized and shaped for engagement with the container 14.

The container 14 is formed of a bottom wall 42 and a pair of sidewalls 44 and 46 projecting upward therefrom. The sidewalls 44, 46 have forward edges 48 and 50, respectively, that join a forward wall 52 that also depends upward from the bottom wall 42 and joins the forward edges 48 and 50 of the sidewalls 44, 46. The sidewalls 44, 46 are substantially parallel along the elongate length of the container and then merge together at a rearward end 54 of the container to form a V-shaped tail 56. Ideally, the sidewalls 44, 46, bottom wall 42, and forward wall 52 are integrally formed in one piece, preferably from plastic material, such as fiberglass or a non-metallic composite.

In the preferred embodiment, the sidewalls 44, 46 and forward wall 52 are integrally formed with the bottom wall 42 to define an open interior 58 that is not obstructed by any reinforcing members. In addition, the forward wall 52 and sidewalls 44, 46 have exposed edges 60, 62, and 64, respectively, that circumscribe an open top area 66, which provides unobstructed access to the open interior 58. In other words, the top of the container 14 is substantially open and unobstructed except for the inwardly projecting edges 60, 62, and 64.

The edges 62, 64 of the sidewalls 44, 46 form a track 68 in the shape of channels 70 and 72 that engage the side rails 38, 40 of the mounting plate 24. In other words, the side rails 38, 40 are sized and shaped to be slidably engaged and disengaged with the channels 70, 72 in the container 14.

The forward wall 52 includes contoured portions 74 and 76 on either side of the transverse midpoint of the back wall 52 to provide clearance for the plate 24 as the container 14 is slidably engaged onto the mounting assembly 16. In addition, a notch 78 formed at the transverse midpoint of the front wall 52 provides clearance for the fasteners 28 projecting through the plate 24 when the container 14 is slidably engaged with the mounting assembly 16.

In use, the container 14 is positioned so that its longitudinal axis is parallel to the longitudinal axis of the helicopter 12 with the V-shaped tail 56 pointing rearward or opposite the nose of the helicopter 12. The container 14 is then positioned with the forward wall 52 just under the plate 24 and pushed forward under the underside 18 of the fuselage 20 so that the side rails 38, 40 of the plate 24 engage the channels 70, 72 in the sidewalls 44, 46.

The plate 24 is sized and shaped to have a V-shaped end 80 that matches the contour of the V-shaped tail 56 of the container. In addition, the plate 24 has a forward end (not shown) that matches the configuration of the front wall 52 of the container 14. Thus, when the container 14 is fully slid onto the mounting assembly 16, the V-shaped end 80 of the plate will slide into the channels 70, 72 in the V-shaped tail 56 of the container 14, thus providing a secure engagement in this fully engaged or closed position. The channels 70, 72 are sized and shaped to provide a snug fit, thereby preventing entry of the elements into the open interior 58 of the container 14.

In the embodiment illustrated herein, latch members 82 and 84 are positioned in the V-shaped tail 56 of the container 14 to engage catches 86 and 88 bolted on the plate 24, securely fastening the container 14 to the mounting assembly 16 and preventing unintentional disengagement thereof during unusual flight attitudes or from the weight of cargo and the G-forces exerted during flight.

While the preferred embodiment of the invention has been illustrated and described, it is to be understood that various changes may be made therein without departing from the spirit and scope of the invention. Thus, the invention is to be limited only by the scope of the claims that follow.

The embodiments of the invention in which an exclusive property or privilege is claimed are defined as follows:

1. An aircraft cargo pod for attachment to preexisting attachment points on an aircraft having an undercarriage and structural components, the cargo pod comprising:

an elongate container having sides and a bottom attached to said sides to define an open interior, said sides circumscribing a substantially open and unobstructed top and including channels formed therein;

an elongate cover for said container, said cover being sized and shaped to be slidably engaged within said channels of said container to thereby completely cover said interior and prevent entry of the elements into said interior;

means for latching said container to said cover to thereby prevent unintentional disengagement of said container from said cover;

means for affixing said cover to the aircraft's preexisting attachment points such that said container will be slideably engageable and disengageable without interference from the aircraft's structural components and undercarriage.

2. A cargo pod for attachment to the exterior underside of an aircraft fuselage, comprising:

an elongated container having opposing sidewalls, a front wall and a bottom wall, the opposing side walls having forward ends that join said front wall and further having rearward ends that join together to define an unobstructed interior cavity, said front wall and said side walls having exposed edges that circumscribe said interior cavity to define a substantially open top on said container to thereby provide unobstructed access to said interior cavity; said exposed edges on said sidewalls having track means formed therein;

means for mounting said container on the exterior underside of the aircraft fuselage, said mounting means comprising means for attachment to existing attachment points on the exterior underside of the aircraft, and means for engaging said track means such that said container is slidably engageable with said track means from the rear of the aircraft to move from a disengaged position to a fully engaged position, said mounting means further including cover means for completely covering said interior cavity when said container is in said fully engaged position.

3. The cargo pod of claim 2, further comprising means for securing said container to said mounting means when said container is in fully engaged position.

4. The cargo pod of claim 3, wherein said track means comprises a channel formed in said exposed edges of said sidewalls.

5. The cargo pod of claim 4, wherein said engaging means comprises reinforced side edges on said mounting means that are sized and shaped to be received within said channels in said sidewalls.

\* \* \* \* \*